(12) United States Patent
Kadoi

(10) Patent No.: US 10,983,549 B2
(45) Date of Patent: Apr. 20, 2021

(54) VEHICLE PEDAL DEVICE

(71) Applicant: Toyota Jidosha Kabushiki Kaisha, Toyota (JP)

(72) Inventor: Hironori Kadoi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 101 days.

(21) Appl. No.: 16/155,419

(22) Filed: Oct. 9, 2018

(65) Prior Publication Data

US 2019/0163227 A1 May 30, 2019

(30) Foreign Application Priority Data

Nov. 29, 2017 (JP) .............................. JP2017-229535

(51) Int. Cl.
| | |
|---|---|
| *B60K 26/02* | (2006.01) |
| *G05G 5/03* | (2008.04) |
| *G05G 5/05* | (2006.01) |
| *F16H 21/44* | (2006.01) |
| *G05G 1/44* | (2008.04) |

(52) U.S. Cl.
CPC .............. *G05G 5/05* (2013.01); *B60K 26/02* (2013.01); *F16H 21/44* (2013.01); *G05G 5/03* (2013.01); *G05G 1/44* (2013.01); *G05G 2505/00* (2013.01)

(58) Field of Classification Search
CPC ......... B60K 26/02; B60K 26/021; G05G 5/03
See application file for complete search history.

(56) References Cited

U.S. PATENT DOCUMENTS

| | | | | |
|---|---|---|---|---|
| 7,717,012 B2* | 5/2010 | Kim | .................... | G05G 1/38 |
| | | | | 74/512 |
| 8,161,842 B2* | 4/2012 | Kim et al. | | |
| 8,312,789 B2* | 11/2012 | Beck | .................... | G05G 1/44 |
| | | | | 74/513 |
| 8,738,261 B2* | 5/2014 | Yamazaki et al. | | |
| 8,783,129 B2* | 7/2014 | Saito et al. | | |
| 8,806,977 B2* | 8/2014 | Stewart et al. | | |
| 9,067,494 B2* | 6/2015 | Kim et al. | | |
| 9,411,359 B2* | 8/2016 | Min | | |
| 2007/0193401 A1* | 8/2007 | Campbell | ............... | G05G 1/38 |
| | | | | 74/560 |
| 2007/0289402 A1* | 12/2007 | La | ...................... | G05G 1/38 |
| | | | | 74/513 |

(Continued)

FOREIGN PATENT DOCUMENTS

JP 2010-073143 A 4/2010

*Primary Examiner* — Bobby Rushing, Jr.
(74) *Attorney, Agent, or Firm* — Dinsmore & Shohl LLP

(57) ABSTRACT

A vehicle pedal device includes: a pedal pad; a housing provided below the pedal pad and provided with a through-hole; a first link passing through the through-hole, a first end portion of the first link being rotatably connected to the pedal pad, a second end portion of the first link being disposed in the housing; a second link, a first end portion of the second link being rotatably connected to the second end portion of the first link, a second end portion of the second link being supported in the housing; a first urging member configured to urge the second link in a rotation direction in which the pedal pad is displaced upward; and a friction portion pressed against a pressed portion provided in the housing and configured to apply a rotation resistance to the second link.

6 Claims, 10 Drawing Sheets

(56) References Cited

U.S. PATENT DOCUMENTS

2010/0071500 A1* 3/2010 Ohtsubo et al.
2013/0047776 A1* 2/2013 Leone et al.
2013/0091977 A1* 4/2013 Fukushima et al.
2014/0208886 A1  7/2014 Kim

* cited by examiner

VEHICLE PEDAL DEVICE

CROSS-REFERENCE TO RELATED APPLICATIONS

This application claims priority to Japanese Patent Application No. 2017-229535 filed on Nov. 29, 2017, which is incorporated herein by reference in its entirety including the specification, drawings and abstract.

BACKGROUND

1. Technical Field

The disclosure relates to a vehicle pedal device.

2. Description of Related Art

Japanese Unexamined Patent Application Publication No. 2010-73143 (JP 2010-73143 A) discloses a vehicle pedal device as described below. That is, in the vehicle pedal device in JP 2010-73143 A, a first end portion of a first link is rotatably connected to a pedal pad of which a lower end portion is rotatably supported. A second end portion of the first link is rotatably connected to a first end portion of a second link. A second end portion of the second link is supported in a housing such that the second end portion can rotate in a first rotation direction in which the pedal pad is displaced upward and a second rotation direction in which the pedal pad is displaced downward. The pedal pad is urged upward by an urging member. When a stepping-on force is applied to an upper surface of the pedal pad and the pedal pad is displaced downward, the second link rotates in the second rotation direction against an urging force of the urging member. When application of the stepping-on force to the upper surface of the pedal pad is stopped, the second link rotates in the first rotation direction due to the urging force of the urging member- and the pedal pad returns to an original position.

SUMMARY

In the case of the vehicle pedal device in JP 2010-73143 A, only the urging force of the urging member is a rotation resistance that is applied when an operator applies the stepping-on force to the pedal pad such that the pedal pad is rotated. Accordingly, at an initial stage of rotation of the pedal pad, the pedal pad may be rotated (be operated) by a rotation amount equal to or greater than the operator's expectation. Therefore, in the case of the vehicle pedal device in JP 2010-73143 A, it is difficult to perform a fine adjustment of the rotation amount of the pedal pad at the initial stage of rotation of the pedal pad.

The disclosure provides a vehicle pedal device with which it is possible to easily perform a fine adjustment of the rotation amount of a pedal pad at an initial stage of rotation of the pedal pad in which a stepping-on force is applied to the pedal pad such that the pedal pad is rotated.

An aspect of the disclosure provides a vehicle pedal device including: a pedal pad disposed to be inclined such that a height of the pedal pad becomes higher toward a front side, a lower end portion of the pedal pad being rotatably supported, an upper surface of the pedal pad being a surface to which a stepping-on force is applied; a housing provided below the pedal pad and provided with a through-hole on a facing wall facing a lower surface of the pedal pad; a first link passing through the through-hole, a first end portion of the first link being rotatably connected to the pedal pad, a second end portion of the first link being disposed in the housing; a second link, a first end portion of the second link being rotatably connected to the second end portion of the first link, a second end portion of the second link being supported in the housing such that the second end portion of the second link is rotatable in a first rotation direction in which the pedal pad is displaced upward and a second rotation direction in which the pedal pad is displaced downward; a first urging member configured to urge the second link in the first rotation direction; and a friction portion pressed against a pressed portion provided in the housing and configured to apply a rotation resistance to the second link by being rubbed with the pressed portion while rotating along with the second link.

The "pressed portion provided in the housing" in the aspect of the disclosure may be a contact surface or the like such as a wall surface formed on a constituent portion of a wall portion or the like constituting a portion of the housing. Examples of a case where "the second link is urged in the first rotation direction" as in the aspect of the disclosure include both of a case where the second link is directly urged and a case where the second link is indirectly urged via another member (including fiction portion, pedal pad, and first link).

In the case of the vehicle pedal device according to the aspect of the disclosure, the first end portion of the first link is rotatably connected to the pedal pad that is disposed to be inclined such that the height of the pedal pad becomes higher toward the front side and of which the lower end portion is rotatably supported. The second end portion of the first link is rotatably connected to the first end portion of the second link. The second end portion of the second link is supported in the housing such that the second end portion is rotatable in the first rotation direction in which the pedal pad is displaced upward and the second rotation direction in which the pedal pad is displaced downward. The urging member urges the second link in the first rotation direction. Therefore, when a stepping-on force is applied to the upper surface of the pedal pad and the pedal pad is displaced downward, the second link rotates in the second rotation direction against an urging force of the urging member. When application of the stepping-on force to the upper surface of the pedal pad is stopped, the second link rotates in the first rotation direction due to the urging force of the urging member and the pedal pad returns to an original position.

In the case of the vehicle pedal device according to the aspect of the disclosure, the friction portion pressed against the pressed portion provided in the housing applies a rotation resistance to the second link by being rubbed with the pressed portion while rotating along with the second link. Here, for example, when a stepping-on force is applied to the upper surface of the pedal pad, the rotation amount of the pedal pad relative to the stepping-on force is relatively small since there is static friction between the friction portion and the pressed portion at an initial stage of rotation of the pedal pad. When an operation of applying the stepping-on force to the pedal pad is continuously performed, the rotation amount of the pedal pad relative to the stepping-on force becomes relatively large.

Therefore, it is possible to easily perform a fine adjustment of the rotation amount of the pedal pad at the initial stage of rotation of the pedal pad in which the stepping-on force is applied to the pedal pad such that the pedal pad is rotated.

In the above aspect of the disclosure, the friction portion may be disposed in the second end portion of the second link, the second link may be provided with an inclined surface inclined downward to extend in a direction from the first end portion of the second link to the friction portion, and the second link may be provided with a hole between the first end portion of the second link and the friction portion, the hole penetrating the second link in a downward direction from the inclined surface.

Here, in the case of a configuration (comparative example) in which the hole is not provided between the first end portion of the second link and the friction portion, the following phenomenon may occur when a foreign substance enters the housing through the through-hole of the housing. That is, the foreign substance entering the housing may roll on the inclined surface that is inclined downward to extend in the direction from the first end portion to the friction portion and enter the area between the friction portion and the pressed portion. When the foreign substance enters the area between the friction portion and the pressed portion, there may be abnormal friction.

Unlike the comparative example, in the case of the vehicle pedal device according to the aspect of the disclosure, even when the foreign substance entering the housing rolls on the inclined surface in a direction from the first end portion to the friction portion, the foreign substance falls into the hole, and thus the foreign substance is restrained from reaching the friction portion since the second link is provided with the bole between the first end portion and the friction portion, the hole penetrating the second link in the downward direction from the inclined surface. Therefore, it is possible to restrain the foreign substance from entering the area between the friction portion and the pressed portion.

In the above aspect of the disclosure, the first urging member may be configured to urge the second link in the first rotation direction via the friction portion by urging the friction portion in the first rotation direction and the second link may be rotatable in the first rotation direction while being separated from the friction portion and may include a second urging member configured to urge the second link in the first rotation direction not via the friction portion.

In the case of the vehicle pedal device according to the aspect of the disclosure, the first urging member merges the second link in the first rotation direction via the friction portion by urging the friction portion in the first rotation direction. Therefore, when a stepping-on force is applied to the upper surface of the pedal pad and the pedal pad is displaced downward, the second link and the friction portion rotate in the second rotation direction against an urging force of the first urging member.

When application of the stepping-on force to the pedal pad is stopped, the second link and the friction portion rotate in the first rotation direction due to the urging force of the first urging member and the pedal pad returns to the original position.

Here, the first urging member urges the second link in the first rotation direction via the friction portion by urging the friction portion in the first rotation direction. Therefore, for example, when the foreign substance enters the area between the friction portion and the pressed portion and a frictional force between the friction portion and the pressed portion becomes large, an urging force that is applied to the second link by the first urging member may be weakened.

However, in the case of the configuration according to the aspect of the disclosure, even when the urging force that is applied to the second link by the first urging member is weakened, the second link can be rotated in the first rotation direction while being separated from the friction portion due to an urging force of the second urging member since the second urging member urges the second link in the first rotation direction not via the friction portion. Accordingly, the pedal pad can be returned to an original position.

The vehicle pedal device according to the above configuration may further include a pressing member supported in the housing by a rotation shaft such that the pressing member is rotatable in a pressing direction in which the friction portion is pressed against the pressed portion, the rotation shaft of the pressing member being positioned at a different position from a rotation shaft of the second link. The first urging member may be configured such that: a first end portion of the first urging member is in contact with the friction portion and urges the second link in the first rotation direction via the friction portion by urging the friction portion in the first rotation direction; a second end portion of the first urging member is in contact with the pressing member and urges the pressing member in the pressing direction; and urging force applied to the pressing member is increased when the second link rotates in the second rotation direction against an urging force applied to the second link.

In the case of the vehicle pedal device according to the aspect of the disclosure, the first end portion of the first urging member is in contact with the friction portion and urges the second link in the first rotation direction via the friction portion by urging the friction portion in the first rotation direction. The second end portion of the first urging member is in contact with the pressing member and urges the pressing member in the pressing direction.

When a stepping-on force is applied to the upper surface of the pedal pad and the pedal pad is displaced downward, the second link rotates in the second rotation direction against the urging force of the first urging member that is applied to the second link, and thus an urging force applied to the pressing member is increased. Therefore, a pressing force by which the pressing member presses the friction portion against the pressed portion is increased and a frictional force between the friction portion and the pressed portion is also increased.

Therefore, when there is an increase or decrease in stepping-on force that is applied to the pedal pad stopped in a state where a large stepping-on force is applied to the pedal pad, a larger static friction force is generated between the friction portion and the pressed portion at the initial stage of rotation of the pedal pad in comparison with a case where there is an increase or decrease in stepping-on force that is applied to the pedal pad stopped in a state where a relatively small stepping-on force is applied to the pedal pad. Therefore, it is possible to more easily perform a fine adjustment of the rotation amount of the pedal pad in a case where there is an increase or decrease in stepping-on force that is applied to the pedal pad stopped in a state where a large stepping-on force is applied to the pedal pad.

With the configuration as described above, the aspect of the disclosure has a more excellent effect that it is possible to easily perform a fine adjustment of the rotation amount of a pedal pad at an initial stage of rotation of the pedal pad in which a stepping-on force is applied to the pedal pad such that the pedal pad is rotated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a side sectional view illustrating a state where a pedal pad of the vehicle pedal device according to the embodiment is not stepped on;

FIG. 4 is a side sectional view illustrating a state where the pedal pad of the vehicle pedal device according to the embodiment is maximally stepped on;

FIG. 5 is a side sectional view illustrating a state where the pedal pad of the vehicle pedal device according to the embodiment is not stepped on;

DETAILED DESCRIPTION OF EMBODIMENTS

Hereinafter, an example of an embodiment of the disclosure will be described based on drawings. Arrows FR, UP, RH which are appropriately illustrated in each drawing represent a front side in a vehicle front-rear direction, an upper side in a vehicle height direction, and a right side in a vehicle width direction, respectively. Hereinafter, the vehicle front-rear direction, a vehicle right-left direction, and the vehicle height direction may be simply referred to as a front-rear direction, a right-left direction, and a height direction. A direction parallel to the vehicle right-left direction may be referred to as the vehicle width direction. The expression "as seen from a lateral side" below means a case where a vehicle is seen in a direction from one side to the opposite side in the vehicle width direction.

Vehicle Pedal Device 10

Figure 1:
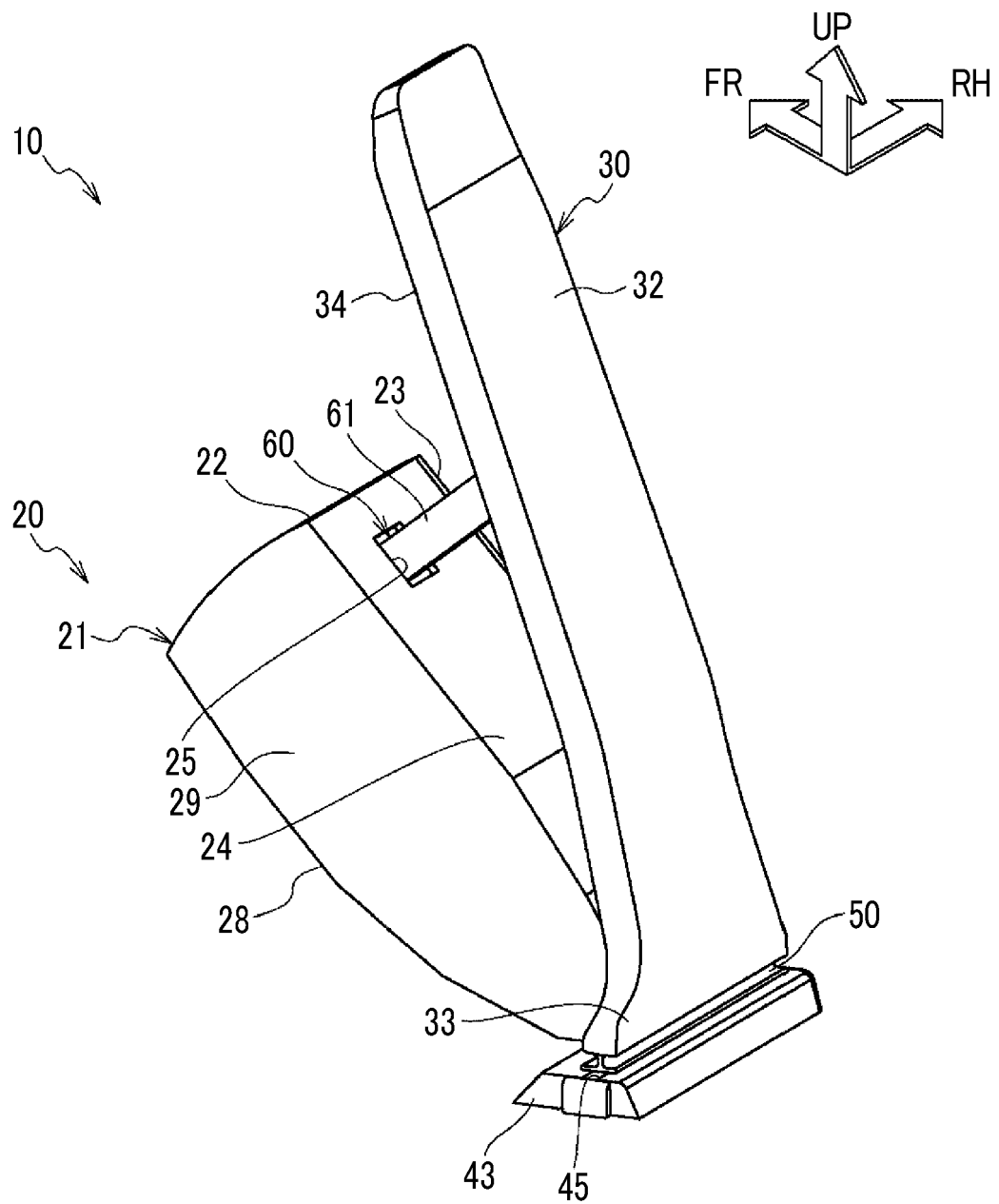
FIG. 1 is a perspective view illustrating the configuration of a vehicle pedal device according to an embodiment.
Figure 2:
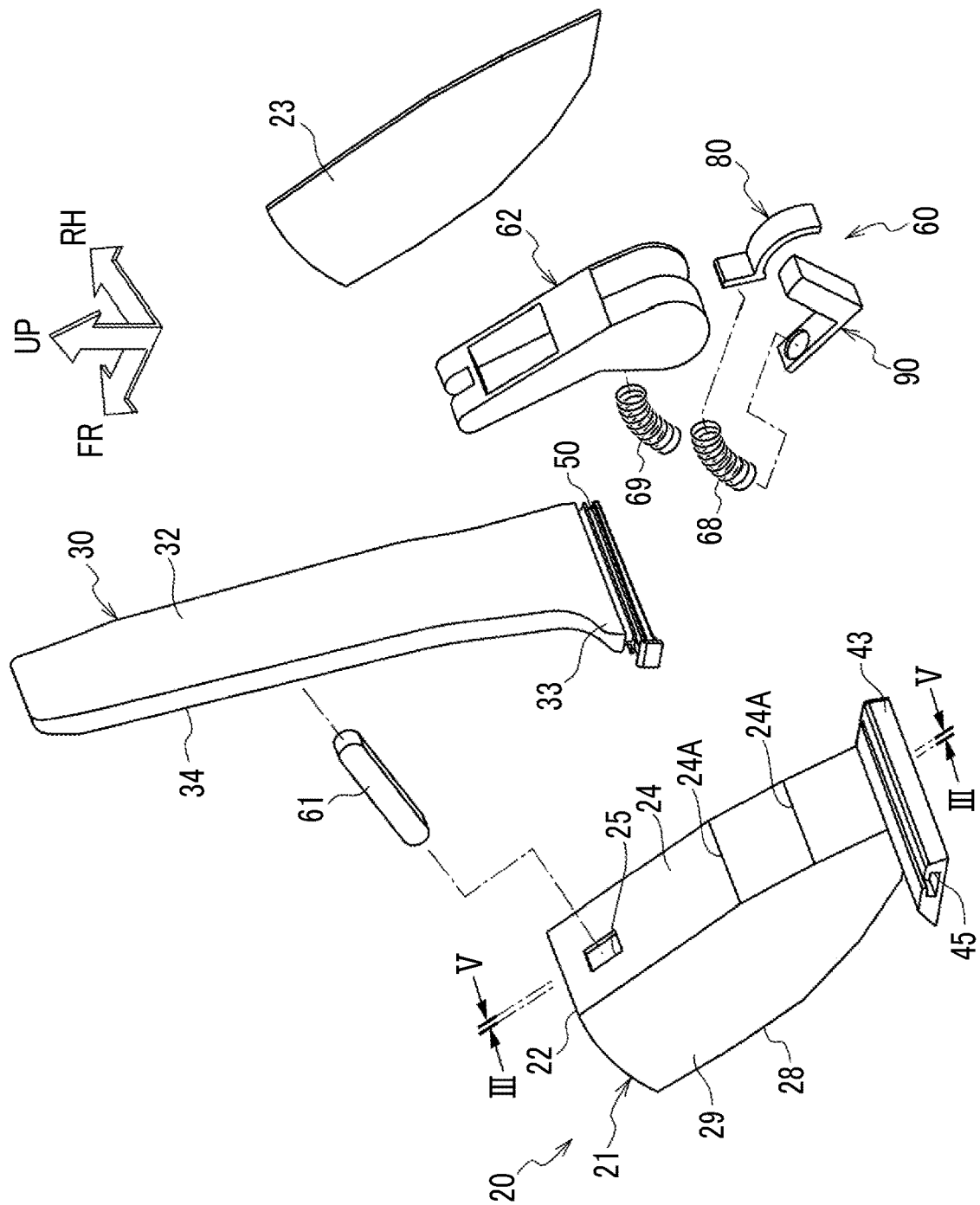
FIG. 2 is an exploded perspective view illustrating the configuration of the vehicle pedal device according to the embodiment.

A configuration of a vehicle pedal device 10 according to the present embodiment will be described. FIG. 1 is a perspective view illustrating the configuration of the vehicle pedal device 10. FIG. 2 is an exploded perspective view illustrating the configuration of the vehicle pedal device 10.

For example, the vehicle pedal device 10 is an organ type pedal device used as an accelerator pedal of an automobile, which is an example of a vehicle. Specifically, the vehicle pedal device 10 is provided with a housing 20, a support 43, a pedal pad 30, and a link mechanism 60, as illustrated in FIGS. 1 and 2. Hereinafter, specific configurations of the housing 20, the support 43, the pedal pad 30, and the link mechanism 60 will be described.

Housing 20

Figure 3:
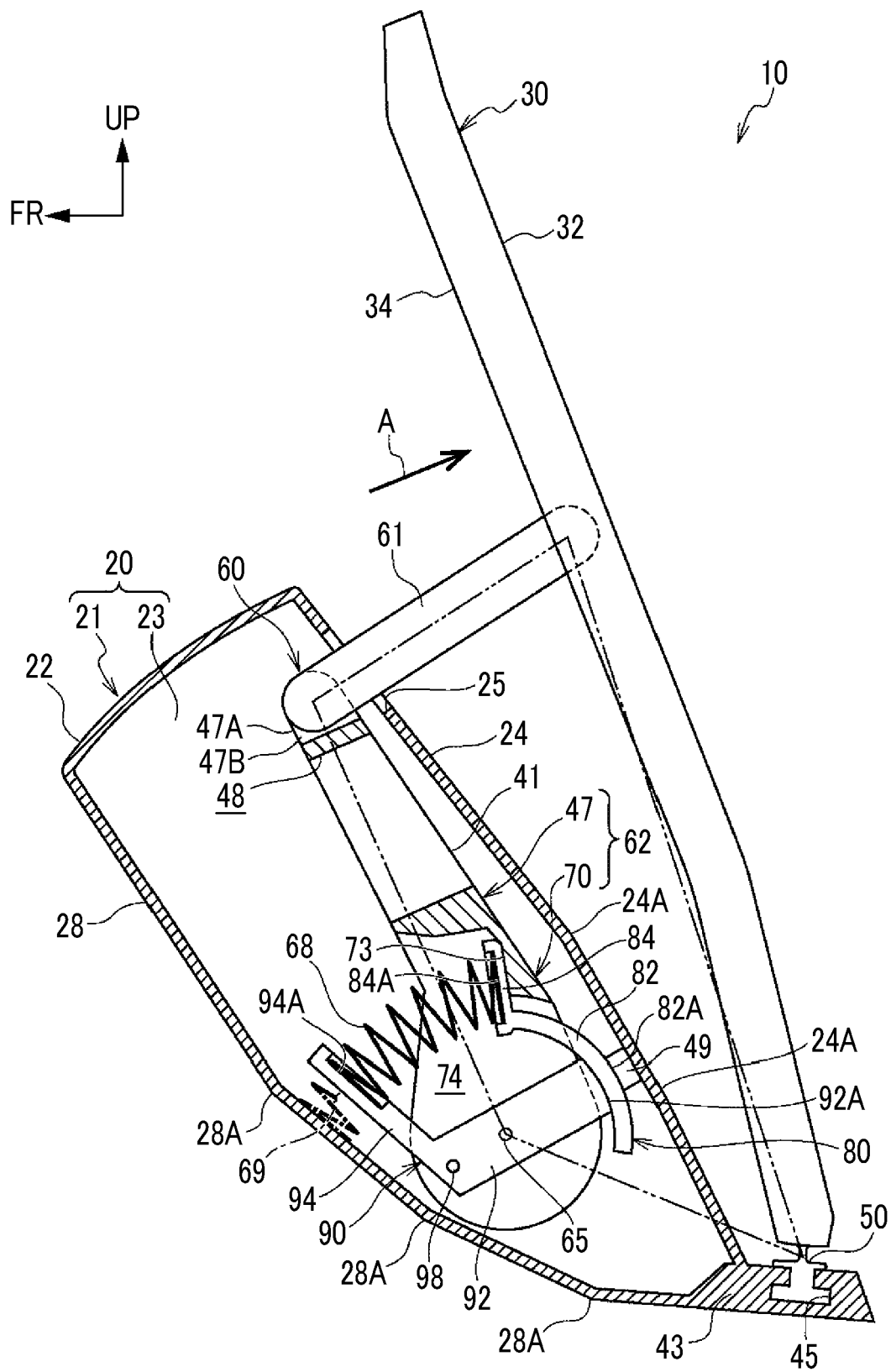

As illustrated in FIG. 3, the housing 20 is a housing that accommodates the link mechanism 60 as a component. A portion of a first link 61 (which will be described later) of the link mechanism 60 is disposed outside the housing 20. The housing 20 is installed on a floor panel (not shown) which is an example of a floor portion of the automobile.

Specifically, the housing 20 is provided with a main body 21 and a cover 23 (lid), as illustrated in FIG. 2. The main body 21 is formed into a box-shape of which a right side surface is provided with an opening. Specifically, the main body 21 is provided with a front wall 22, an upper wall 24, a lower wall 28, and a side wall 29 (refer to FIG. 2), as illustrated in FIG. 3.

The upper wall 24 is a wall facing the upper side and the upper wall 24 extends in an oblique forward and upward direction from the support 43. That is, the upper wall 24 is disposed to be inclined such that the height of the upper wall 24 becomes higher toward the front side. The upper wall 24 faces a lower surface 34 of the pedal pad 30. That is, the upper wall 24 is an example of a facing wall of the housing 20, the facing wall facing the pedal pad 30.

A through-hole 25, through which the first link 61 (which will be described later) passes, is formed in an upper portion (front portion) of the upper wall 24. The through-hole 25 penetrates the upper wall 24 in the thickness direction of the upper wall 24. An inner wall (inner surface) of a lower portion (rear portion) of the upper wall 24 is provided with a pressed portion 49 against which a friction surface 82A of a slider 80, which will be described later, is pressed. That is, the pressed portion 49 is provided in the housing 20. The pressed portion 49 protrudes in an oblique forward and downward direction from the inner wall of the upper wall 24. For example, the pressed portion 49 is formed of elastic material, such as rubber. The upper wall 24 is formed with a plurality of ridges 24A (refer to FIG. 2) extending in the vehicle width direction.

The front wall 22 extends in an oblique forward and downward direction from an upper end portion (front end portion) of the upper wall 24. An outer surface (front surface) of the front wall 22 faces an oblique forward and upward direction.

The lower wall 28 extends in an oblique rearward and downward direction from a lower end portion (front end portion) of the front wall 22. The lower wall 28 is a wall onto which a second link 62 (which will be described later) abuts. The lower wall 28 is formed with a plurality of ridges 28A extending in the vehicle width direction.

The side wall 29 illustrated in FIG. 2 is connected to left end portions of the upper wall 24, the front wall 22, and the lower wall 28. The side wall 29 is a wall of a left side surface of the main body 21.

The cover 23 illustrated in FIG. 2 is a cover that covers an opening in a right side surface of the main body 21. The cover 23 is connected to right end portions of the upper wall 24, the front wall 22, and the lower wall 28. The cover 23 is a wall of a right side surface of the housing 20.

Support 43

As illustrated in FIGS. 1 and 3, the support 43 is a portion having a function of supporting the pedal pad 30. The support 43 is installed on the floor panel (not shown). The support 43 is provided behind the housing 20 in the vehicle front-rear direction and is provided for a lower portion of the housing 20.

As illustrated in FIG. 3, the support 43 has a plate-like shape of which the thickness direction is parallel to the height direction and is formed into an approximately trapezoidal shape of which a lower base is longer than an upper base as seen from a lateral side. As illustrated in FIG. 2, the support 43 projects toward a left side in the vehicle width direction further than the housing 20 and the width of the support 43 in the vehicle width direction is larger than the width of the housing 20.

As illustrated in FIGS. 2 and 3, an insertion groove 45 into which a hinge portion 50 provided for the pedal pad 30 is inserted is formed in the support 43. The insertion groove 45 is open to the left side in the vehicle width direction and the upper side in the vehicle height direction and is formed to have a reversed T-shape as seen from a lateral side.

Specifically, the hinge portion 50 which is inserted into the insertion groove 45 is integrally provided with a lower end portion of the pedal pad 30 while extending in the vehicle width direction. The hinge portion 50 is formal to have a shape that is obtained by vertically stacking reversed T-shapes, as seen from a lateral side. A portion of the hinge portion 50 that is connected to the lower end portion of the pedal pad 30 is thin and the hinge portion 50 can be deformed such that an upper end portion of the pedal pad 30 swings (moves) in the vehicle front-rear direction about the lower end portion.

When the hinge portion 50 is inserted into the insertion groove 45 through an opening of the insertion groove 45 on the left side in the vehicle width direction, the pedal pad 30 is attached to the support 43. Accordingly, the lower end portion of the pedal pad 30 is rotatably supported by the support 43. Therefore, a position where the insertion groove 45 is formed is a supporting position at which the lower end portion of the pedal pad 30 is supported by the support 43. Specifically, the pedal pad 30 can rotate such that the upper end portion thereof swings (moves) in the vehicle front-rear direction about the lower end portion.

Pedal Pad 30

The pedal pad 30 is an operated portion which a driver steps on. Specifically, the pedal pad 30 is formed to have a plate-like shape. As illustrated in FIG. 1, the lower end portion of the pedal pad 30 has a projecting portion 33 that projects toward the left side in the vehicle width direction and the pedal pad 30 has an approximately rectangular shape that is long in the height direction as seen in a direction along an arrow A in FIG. 3 (thickness direction of pedal pad 30).

As illustrated in FIG. 3, the pedal pad 30 is disposed to be inclined such that the pedal pad 30 extends in a direction from the support 43 to a position above the housing 20. That is, the pedal pad 30 is disposed being inclined such that the height of the pedal pad 30 becomes higher toward the front side. Accordingly, an upper surface 32 of the pedal pad 30 faces an oblique rearward and upward direction. The lower surface 34 of the pedal pad 30 faces an oblique forward and downward direction.

Since the pedal pad 30 is disposed being inclined such that the pedal pad 30 extends in the direction from the support 43 to the position above the housing 20, the pedal pad 30 is provided above the housing 20. In other words, the housing 20 is provided below the pedal pad 30. That is, the housing 20 is provided close to the lower surface 34 that is opposite to the upper surface 32 of the pedal pad 30.

As described above, since the hinge portion 50 is provided, the pedal pad 30 can rotate such that the upper end portion thereof swings (moves) in the vehicle front-rear direction about the lower end portion. That is, the pedal pad 30 can be displaced upward and downward. A foot is to be placed on the upper surface 32 of the pedal pad 30 and a stepping-on force from the foot is applied to the upper surface 32. When the stepping-on force is applied, the pedal pad 30 is displaced downward.

Link Mechanism 60

Figure 4:
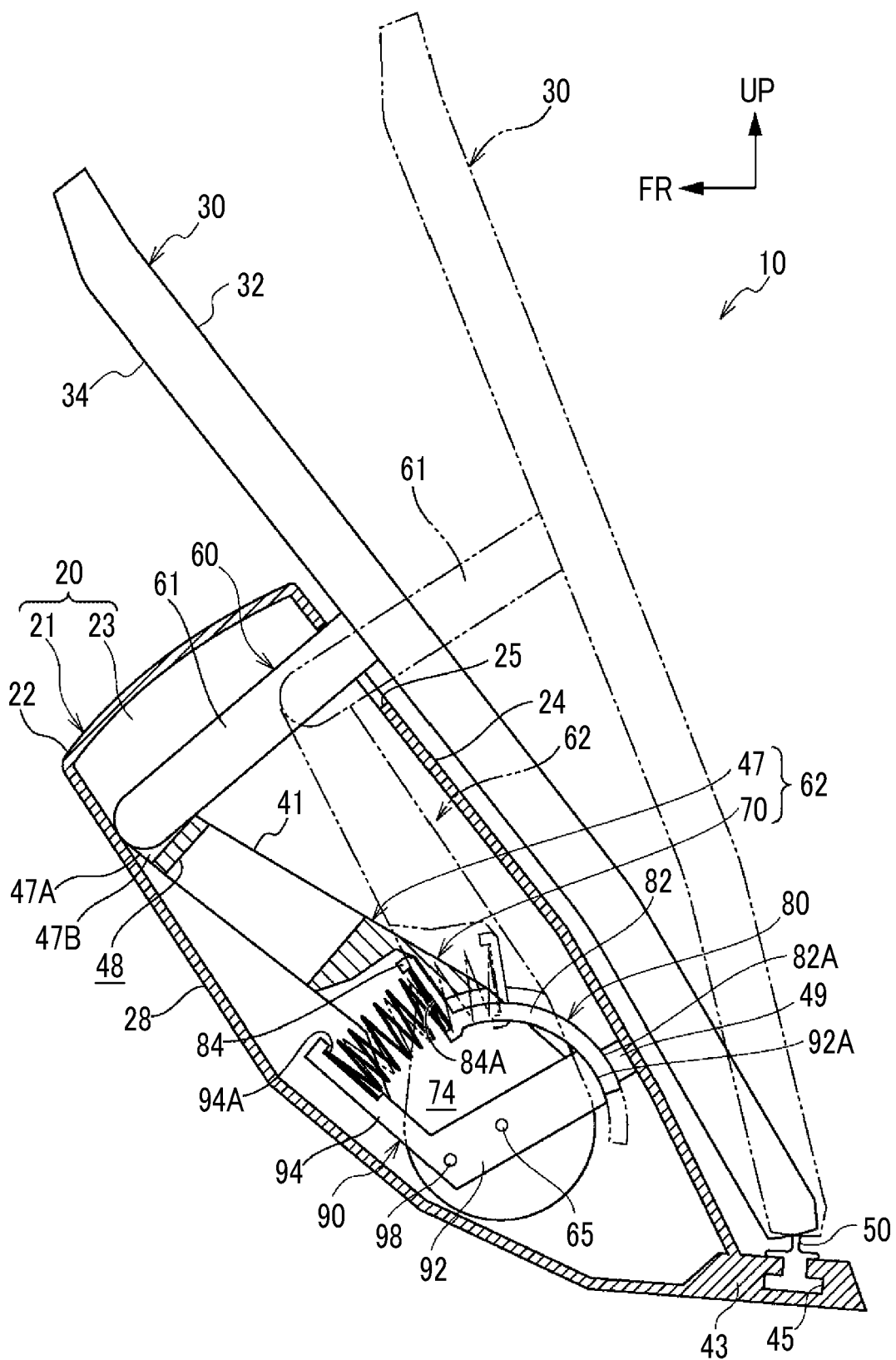
Figure 5:
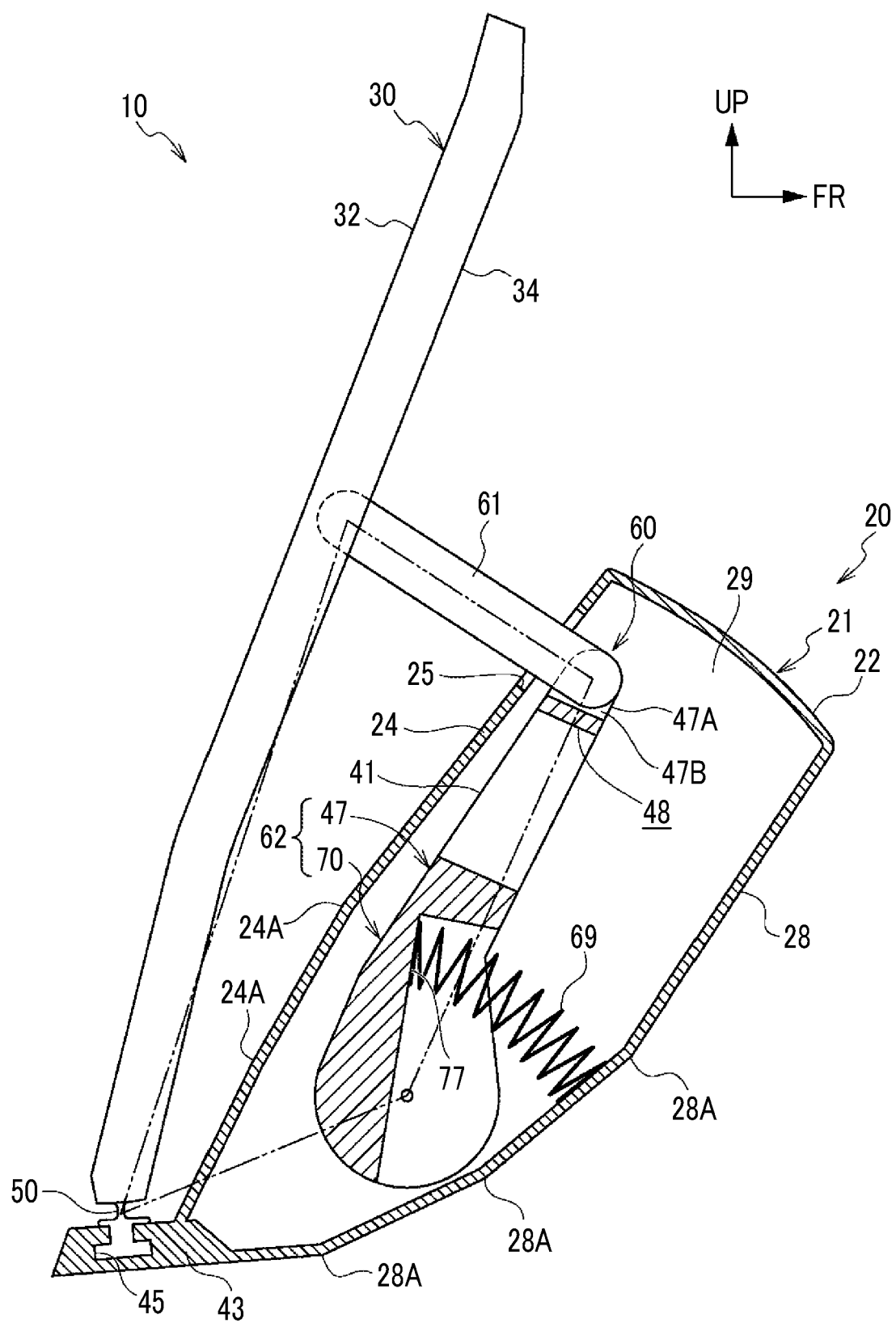

The link mechanism 60 has a function of restricting the range at rotation of the pedal pad 30 to a range set in advance. In other words, the link mechanism 60 has a function of determining a specific range as the range of rotation of the pedal pad 30. With the link mechanism 60 being provided, the pedal pad 30 rotates within a range between a first position (position illustrated by two-dot chain line in FIG. 4 and position illustrated in FIG. 5) illustrated in FIG. 3 and a second position illustrated by a solid line in FIG. 4. FIGS. 3 and 4 are sectional views obtained by cutting the housing 20 and the support 43 along the line III-III in FIG. 2 and cutting the second link 62 (which will be described later) along the line III-III in FIG. 6. FIG. 5 is a sectional view obtained by cutting the housing 20 and the support 43 along the line V-V in FIG. 2 and cutting the second link 62 (which will be described later) along the line V-V in FIG. 6.

The link mechanism 60 has a function of urging the pedal pad 30 in a direction from the second position illustrated by the solid line in FIG. 4 to the first position illustrated in FIG. 3. Therefore, the first position illustrated in FIG. 3 is an initial position at which the pedal pad 30 is positioned when the pedal pad 30 is not stepped on yet. In other words, the first position illustrated in FIG. 3 is a position at which the pedal pad 30 is positioned in a non-load state where there is no load acting on the upper surface 32 of the pedal pad 30.

The second position illustrated by the solid line in FIG. 4 is a maximum stepping-on position of which the pedal pad 30 is positioned when the pedal pad 30 is maximally stepped on against a stepping-on force acting on the pedal pad 30.

For example, the link mechanism 60 is configured as follows. That is, as illustrated in FIG. 2, the link mechanism 60 is provided with the first link 61, the second link 62, coil springs 68, 69, a slider 80, and a lever 90.

As illustrated in FIG. 3, the first link 61 is elongated in an oblique rearward and upward direction. The first link 61 passes through the through-hole 25 of the upper wall 24 of the housing 20. An upper end portion (example of first end portion) of the first link 61 is connected to the pedal pad 30 outside the housing 20 such that the upper end portion can rotate about an axis parallel to the vehicle width direction. A lower end portion (example of second end portion) of the first link 61 is disposed in the housing 20.

Figure 6:
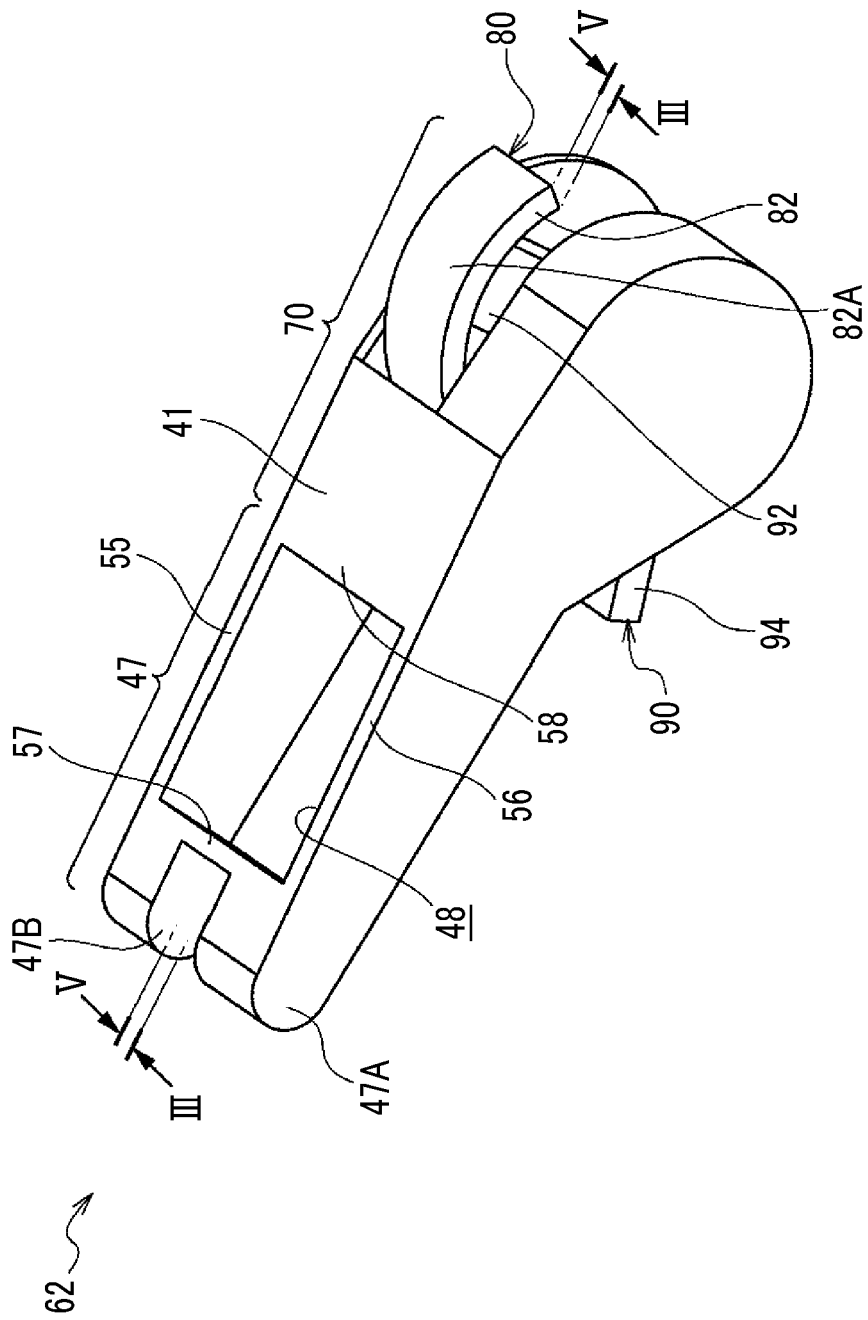
FIG. 6 is a perspective view illustrating the configuration of a second link according to the embodiment.

The entire second link 62 is disposed in the housing 20 as illustrated in FIG. 3. The second link 62 is provided with a main body portion 70 and an extending portion 47 as illustrated in FIG. 6.

As illustrated in FIG. 3, the main body portion 7 is supported by a rotation shaft 65 in the housing 20 such that the main body portion 70 can rotate in a first rotation direction (clockwise direction in FIG. 3) and a second rotation direction (counter-clockwise direction in FIG. 3). Specifically, the main body portion 70 is supported with respect to the side wall 29 and the cover 23 of the housing 20 such that the main body portion 70 can rotate about the rotation shaft 65 extending in the vehicle width direction. That is, the main body portion 70 is a supported portion supported by the housing 20.

The extending portion 47 extends outward in a radial direction of the rotation shaft 65 from the main body portion 70. Specifically, the extending portion 47 extends in an oblique forward and upward direction from the main body portion 70. Therefore, the second link 62 is elongated in the oblique forward and upward direction as a whole.

The second link 62 is disposed to be inclined such that the height of the main body portion 70 is lower than the height of a tip end portion 47A of the extending portion 47. Therefore, the second link 62 is provided with an upper surface 41 which is an inclined surface that is inclined downward to extend in a direction from the tip end portion 47A of the extending portion 47 to the main body portion 70. The upper surface 41 faces the upper wall 24. The upper surface 41 faces the through-hole 25 at the tip end portion 47A of the extending portion 47.

The tip end portion 47A of the extending portion 47 is connected to the lower end portion of the first link 61 such that the tip end portion 47A can rotate about an axis parallel to the vehicle width direction. The lower end portion of the first link 61 is rotatably connected to the tip end portion 47A while being disposed in a notch portion 47B formed in the tip end portion 47A.

As described above, the tip end portion 47A of the extending portion 47 is an example of a first end portion of the second link 62 that is connected to the lower end portion of the first link 61 and the main body portion 70 is an example of a second end portion of the second link 62 that is supported by the housing 20.

The extending portion 47 is provided with a hole 48 between the tip end portion 47A and the main body portion 70. Specifically the hole 48 is formed between an arc portion 82 (which will be described later) of the slider 80 disposed in the main body portion 70 and the tip end portion 47A of the extending portion 47. The hole 48 penetrates the upper surface 41 of the extending portion 47 in a downward direction. That is, the hole 48 penetrates the extending portion 47 in the thickness direction of the extending portion 47 (oblique rearward and upward direction). As seen in the thickness direction of the extending portion 47 (oblique rearward and upward direction), the hole 48 has a rectangular shape that is elongated in an oblique forward and upward direction.

Figure 7:
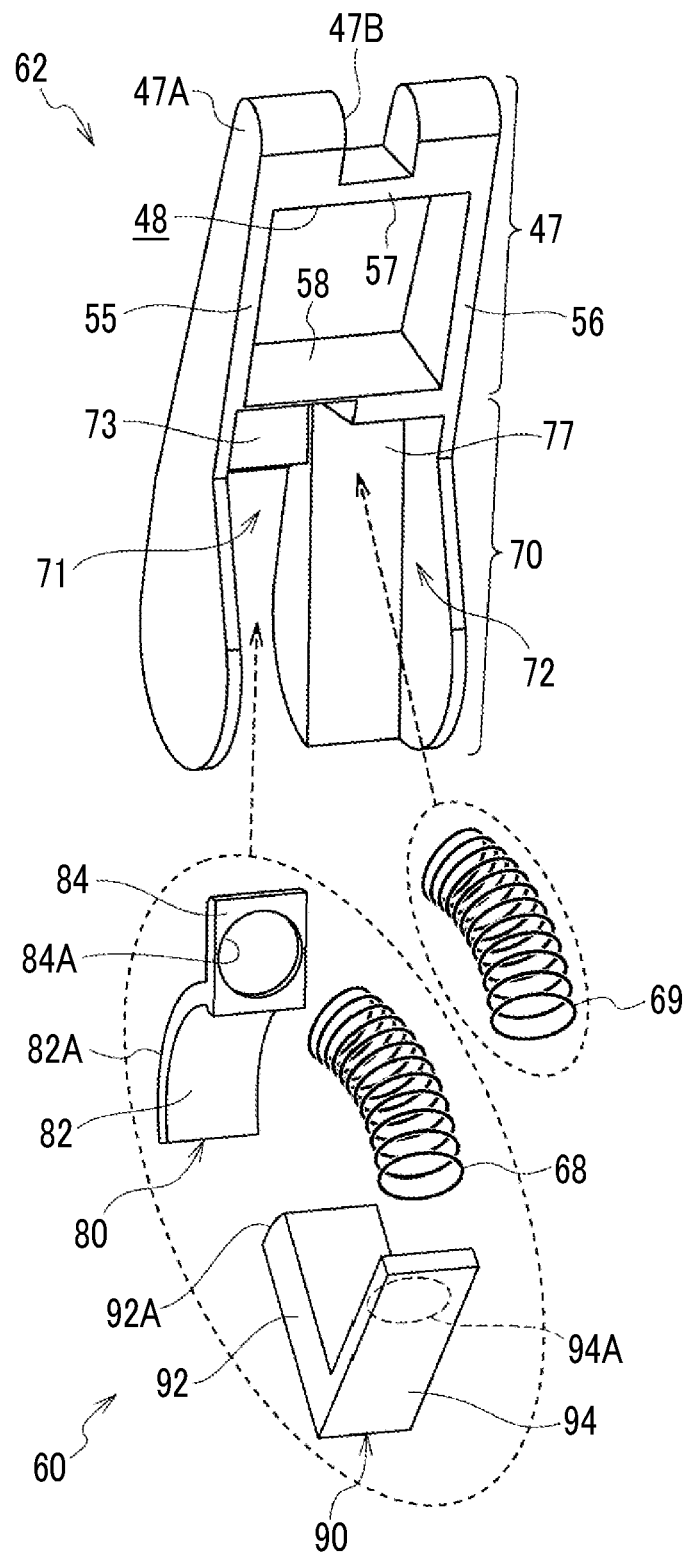
FIG. 7 is a perspective view illustrating the configuration of a link mechanism according to the embodiment.

Regarding the second link 62, since the single rectangular hole 48 is formed in the extending portion 47 of the second link 62, the extending portion 47 has an approximately frame-like shape (refer to FIGS. 6 and 7) as seen in the thickness direction of the extending portion 47 (oblique rearward and upward direction). That is, as illustrated in FIGS. 6 and 7, the extending portion 47 is provided with a right side portion 55 disposed to the right of the hole 48, a left side portion 56 disposed to the left of the hole 48, a front side portion 57 disposed ahead of the hole 48, and a rear side portion 58 disposed behind the hole 48.

Regarding the link mechanism 60, the pedal pad 30, the first link 61, and the second link 62 are connected to each other as described above and the pedal pad 30, the first link 61, and the second link 62 constitute a four-joint link structure in which the lower end portion (hinge portion 50) of the pedal pad 30 and the rotation shaft 65 of the main body portion 70 of the second link 42 are fixed portions (portions that are not displaced).

Accordingly, when the pedal pad 30 is displaced downward, the second link 62 rotates in the second rotation direction (counter-clockwise direction in FIG. 3) and when the second link 62 rotates in the first rotation direction (clockwise direction in FIG. 3), the pedal pad 30 is displaced upward. Therefore, the first rotation direction is a rotation direction in which the pedal pad 30 is displaced upward and the second rotation direction is a rotation direction in which the pedal pad 30 is displaced downward.

When the second link 62 rotates in the first rotation direction, the extending portion 47 abuts onto a stopper (not shown), which is provided in the housing 20 and serves as a restriction portion, so that the rotational motion is restricted. Accordingly, displacement of the pedal pad 30 in an upward direction is restricted. That is, a position (position illustrated in FIG. 3) at which the pedal pad 30 is positioned when the extending portion 47 of the second link 62 abuts onto the stopper (not shown) is the initial position of the pedal pad 30.

When the second link 62 rotates in the second rotation direction, as illustrated in FIG. 4, the extending portion 47 abuts onto the lower wall 28 of the housing 20 so that the rotational motion is restricted. Accordingly, displacement of the pedal pad 30 in a downward direction is restricted. That is, a position (position illustrated by solid line in FIG. 4) at which the pedal pad 30 is positioned when the extending portion 47 of the second link 62 abuts onto the lower wall 28 is the maximum stepping-on position of the pedal pad 30.

The rotation shaft 65 is provided with an encoder (not shown) that measures the rotation amount of the second link 62. The encoder (not shown) measures a stepping-on amount of the pedal pad 30.

As illustrated in FIG. 7, the main body portion 70 is provided with a first disposition space 71 in which the coil spring 68, the slider 80, and the lever 90 are disposed and a second disposition space 72 in which the coil spring 69 is disposed. The first disposition space 71 is disposed on the right side of the main body portion 70 in the vehicle width direction. The second disposition space 72 is disposed on the left side of the main body portion 70 in the vehicle width direction. That is, the first disposition space 71 and the second disposition space 72 are disposed to be arranged in the vehicle width direction.

The lever 90 disposed in the first disposition space 71 is an example of a pressing member that presses the slider 80 against the pressed portion 49 (refer to FIG. 3). As illustrated in FIG. 3, the lever 90 is formed into an L-shape as seen from a lateral side. Specifically, the lever 90 is provided with a pressing portion 92 that is elongated in an oblique rearward and upward direction and an arm portion 94 that extends in an oblique forward and upward direction from a lower end portion of the pressing portion 92.

The pressing portion 92 is a portion of the lever 90 and a portion having a function of pressing the arc portion 82 (which will be described later) of the slider 80 against the pressed portion 49. Specifically, the pressing portion 92 is provided with a pressing surface 92A that presses the arc portion 82 (which will be described later) of the slider 80. The pressing surface 92A is a surface facing an oblique rearward and upward direction and has an arc shape extending in a circumferential direction of the rotation shaft 65.

The arm portion 94 is a portion of the lever 90 and is a portion having a function as a holding portion that holds the coil spring 68. A recess portion 94A holding the coil spring 68 is formed in a surface of a tip end portion (upper front portion) of the arm portion 94, the surface facing an oblique rearward and upward direction.

In the housing 20, the lever 90 is supported by a rotation shaft 98 such that the lever 90 can rotate in a pressing direction (counter-clockwise direction in FIG. 3) in which the slider 80 is pressed against the pressed portion 49, the rotation shaft 98 being positioned at a different position from the rotation shaft 65. Specifically, the lever 90 is supported with respect to the side wall 29 and the cover 23 of the housing 20 such that the lever 90 can rotate about the rotation shaft 98 extending in the vehicle width direction. More specifically, a lower end is of the pressing portion 92 of the lever 90 is supported by the rotation shaft 98. In other words, a connecting portion (bent portion) between the arm portion 94 and the pressing portion 92 is supported by the rotation shaft 98.

Specifically, the rotation shaft 98 is disposed ahead of and below the rotation shaft 65. That is, the rotation shaft 65 is disposed between the rotation shaft 98 and the arc portion 82 of the slider (pressed portion 49). Accordingly, when the lever 90 rotates in the pressing direction (counter-clockwise direction in FIG. 3), the pressing portion 92 rotates while projecting (protruding) toward the pressed portion 49 side and presses the arc portion 82 against the pressed portion 49. The second link 62 is formed with a notch such as a long hole such that the second link 62 does not interfere with the rotation shaft 98 when the second link 62 rotates.

The slider 80 disposed in the first disposition space 71 is an example of a friction portion that is pressed against the pressed portion 49 and is rubbed with the pressed portion 49 (refer to FIG. 3). Specifically, the slider 80 is provided with the arc portion 82 that has an arc shape extending in the circumferential direction of the rotation shaft 65 and a holding portion 84 that projects outward in the radial direction of the rotation shaft 65 from a front end portion of the arc portion 82.

The arc portion 82 is a portion of the slider 80 and is a portion having a function of being rubbed with the pressed portion 49. An outer circumference surface (arc surface) of the arc portion 82 is the friction surface 82 that is rubbed with the pressed portion 49. The arc portion 82 is disposed in the main body portion 70 of the second link 62. Specifically, a portion of the arc portion 82 projects toward the upper wall 24 side (upper side) beyond the upper surface 41 of the second link 62. The friction surface 82A faces the upper wall 24 side (upper side). As a result, the upper surface 41 of the second link 62 constitutes an inclined surface that is inclined downward to extend in a direction from the tip end portion 47A of the extending portion 47 to the arc portion 82 (friction surface 82A) (refer to FIGS. 3 and 6).

The slider 80 can rotate about the rotation shaft 65 with the arc portion 82 supported by being interposed between the pressed portion 49 and the pressing surface 92A of the pressing portion 92. The surface roughness of the friction surface 82A is adjusted in order to achieve desirable friction between the friction surface 82A and the pressed portion 49.

The holding portion 84 is a portion of the slider 80 and is a portion having a function as a holding portion that holds the coil spring 68. A recess portion 84A bolding the coil spring 68 is formed in a surface of the holding portion 84, the surface facing the front side. A surface of the holding portion 84 that faces the rear side abuts onto an abutting surface 73 that is formed in the main body portion 70 of the second link 62.

The coil spring 68 disposed in the first disposition space 71 is an example of an urging member (first urging member) that urges the second link 62 in the first rotation direction (clockwise direction in FIG. 3). The coil spring 68 is a spiral (coiled) compressing spring. The coil spring 68 is held between the recess portion 84A of the holding portion 84 of the slider 80 and the recess portion 94A of the arm portion 94 of the lever 90.

Accordingly, a first end portion of the coil spring 68 is in contact with the holding portion 84 of the slider 80 and urges the slider 80 in the first rotation direction (clockwise direction in FIG. 3). Therefore, the holding portion 84 of the slider 80 urges the abutting surface 73 of the main body portion 70 in the first rotation direction (clockwise direction in FIG. 3). That is, the first end portion of the coil spring 68 urges the second link 62 via the slider 80 in the first rotation direction (clockwise direction in FIG. 3) in which the pedal pad 30 is displaced upward.

When a stepping-on force is applied to the upper surface 32 of the pedal pad 30 and the pedal pad 30 is displaced downward, the second link 62 rotates in the second rotation direction (counter-clockwise direction in FIG. 4) against an urging force of the coil spring 68 that is applied to the second link 62, as illustrated in FIG. 4. In this case, the abutting surface 73 of the second link 62 presses the holding portion 84 of the slider 80 forward and the slider 80 rotates in the second rotation direction (counter-clockwise direction in FIG. 4) along with the second link 62.

When application of the stepping-on force to the pedal pad 30 is stopped, the second link 62 rotates in the first rotation direction (clockwise direction in FIG. 4) along with the slider 80 due to the urging force of the coil spring 68 that is applied to the second link 62.

When the slider 80 rotates in the first rotation direction and the second rotation direction along with the second link 62 as described above, the slider 80 applies a rotation resistance to the second link 62 with the friction surface 82A of the are portion 82 rubbed with the pressed portion 49.

The abutting surface 73 of the second link 62 is in contact with the holding portion 84 such that the abutting surface 73 can be separated from the holding portion 84. Therefore, the second link 62 can rotate in the first rotation direction (clockwise direction in FIG. 3) while being separated from the slider 80.

Meanwhile, a second end portion of the coil spring 68 is in contact with the arm portion 94 of the lever 90 and presses the arm portion 94 in an oblique forward and downward direction. Therefore, the lever 90 is urged in the pressing direction (counter-clockwise direction in FIG. 3) in which the arc portion 82 of the slider 80 is pressed against the pressed portion 49. That is, the second end portion of the coil spring 68 is in contact with the lever 90 and urges the lever 90 in the pressing direction (counter-clockwise direction in FIG. 3). Accordingly, the friction surface 82A of the slider 80 is pressed against the pressed portion 49.

When a stepping-on force is applied to the pedal pad 30 and the pedal pad 30 is displaced downward, the second link 62 rotates in the second rotation direction (counter-clockwise direction in FIG. 3) against an urging force of the coil spring 68 that is applied to the second link 62. In this case, the coil spring 68 is compressed and the urging force of the coil spring 68 that is applied to the lever 90 is increased.

The coil spring 69 disposed in the second disposition space 72 is an example of a second urging member that urges the second link 62 in the first rotation direction not via the slider 80 (friction portion). The coil spring 69 is a spiral (coiled) compressing spring. As illustrated in FIG. 5, a first end portion of the coil spring 69 is in contact with an inner wall of the lower wall 28 of the housing 20. A second end portion of the coil spring 69 is in contact with a contact surface 77 formal in the main body portion 70 of the second link 62 and presses the main body portion 70 downward.

That is, the coil spring 69 directly urges the second link 62 in the first rotation direction (clockwise direction in FIG. 3) in which the pedal pad 30 is displaced upward, not via the slider 80.

Operation Effect of Vehicle Pedal Device 10

The operation effect of the vehicle pedal device 10 will be described.

In the case of the vehicle pedal device 10, when a stepping-on force is applied to the upper surface 32 of the pedal pad 30 and the pedal pad 30 is displaced downward, the second link 62 rotates in the second rotation direction (counter-clockwise direction in FIG. 4) against an urging force of the coil spring 68 that is applied to the second link 62, as illustrated in FIG. 4. In this case, the abutting surface 73 of the second link 62 presses the holding portion 84 of the slider 80 forward and the slider 80 rotates in the second rotation direction (counter-clockwise direction in FIG. 4) along with the second link 62.

When application of the stepping-on force to the pedal pad 30 is stopped, the second link 62 rotates in the first rotation direction (clockwise direction in FIG. 4) along with the slider 80 due to the urging force of the coil spring 68 that is applied to the second link 62.

When the slider 80 rotates in the first rotation direction and the second rotation direction along with the second link 62 as described above, the slider 80 applies a rotation resistance to the second link 62 with the friction surface 82A of the arc portion 82 rubbed with the pressed portion 49.

Figure 8:
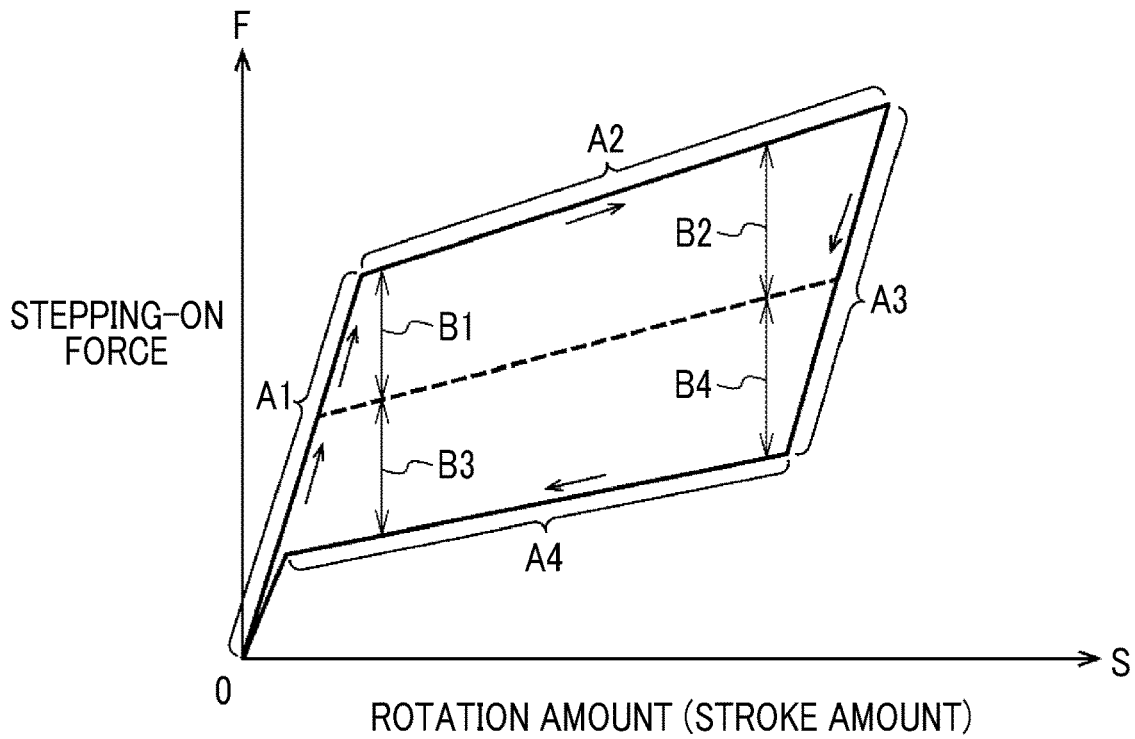
FIG. 8 is a graph illustrating a relationship between a stepping-on force applied to the pedal pad and the rotation amount of the pedal pad related to a case where a stepping-on force is applied to the pedal pad according to the embodiment.

Here, for example, a solid line in FIG. 8 represents a relationship between a stepping-on force applied to the pedal pad 30 and the rotation amount (stroke amount) of the pedal pad 30 related to a case where application of a stepping-on force to the pedal pad 30 is stopped after a stepping-on force is applied to the pedal pad 30 positioned at the initial position such that the pedal pad 30 is rotated to the maximum stepping-on position. In FIG. 8, the vertical axis represents the stepping-on force applied to the pedal pad 30 and the horizontal axis represents the rotation amount (stroke amount) of the pedal pad 30.

As illustrated in FIG. 8, when a stepping-on force is applied to the pedal pad 30 positioned at the initial position, the rotation amount of the pedal pad relative to the stepping-on force is relatively small since there is static friction between the friction surface 82A of the arc portion 82 and the pressed portion 49 at an initial stage of rotation of the pedal pad 30 (section A1 in FIG. 8). When an operation of applying the stepping-on force to the pedal pad 30 is continuously performed, the rotation amount of the pedal pad relative to the stepping-on force becomes relatively large (section A2 in FIG. 8).

Similarly, in a case where application of a stepping-on force to the pedal pad 30 is stopped so that the pedal pad 30 returns to the initial position from the maximum stepping-on position, the rotation amount of the pedal pad relative to a decrease in stepping-on force is relatively small since there is static friction between the friction surface 82A of the arc portion 82 and the pressed portion 49 at the initial stage of rotation of the pedal pad 30 (section A3 in FIG. 8). When an operation in which the stepping-on force applied to the pedal pad 30 is decreased is continuously performed, the rotation amount of the pedal pad relative to the decrease in stepping-on force becomes relatively large (section A4 in FIG. 8).

Therefore, it is possible to easily perform a fine adjustment of the rotation amount of the pedal pad 30 at the initial stage of rotation of the pedal pad 30 in which a stepping-on force is applied to the pedal pad 30 such that the pedal pad 30 is rotated. Arrows B1, B2, B3, B4 in FIG. 8 represent how much the relationship between the stepping-on force and the rotation amount is changed from that in a case "where there is no friction caused by the slider 80 (where urging forces of the coil springs 68, 69 solely act)" (which is represented by a broken line in FIG. 8) due to the friction caused by the slider 80. In the embodiment, the relationship that the arrow B1<the arrow B2, and the relationship that the arrow B3<the arrow B4, are established since a frictional force between the slider 80 and the pressed portion 49 is increased when a stepping-on force is applied to the pedal pad 30 and the second link 62 rotates in the second rotation direction (counterclockwise direction in FIG. 4).

The same applies to a case where there is an increase or decrease in stepping-on force that is applied to the pedal pad 30 stopped between the initial position and the maximum stepping-on position in a state where a stepping-on force is applied to the pedal pad 30. That is, in this case, the rotation amount of the pedal pad relative to an increase or decrease in stepping-on force is relatively small since there is static friction between the friction surface 82A of the arc portion 82 and the pressed portion 49 at an initial stage of rotation of the pedal pad 30 and when an operation in which the stepping-on force is increased or decreased is continuously performed, the rotation amount of the pedal pad 30 relative to the increase or decrease in stepping-on force becomes relatively large.

Therefore, it is possible to easily perform a fine adjustment of the rotation amount of the pedal pad 30 at the initial stage of rotation of the pedal pad 30 in which a stepping-on force applied to the pedal pad 30 is increased or decreased such that the pedal pad 30 is rotated. Even when there is a change in stepping-on force applied to the pedal pad 30 due to vibration of the vehicle in a case where the pedal pad 30 is stopped in a state where a stepping-on force is applied to the pedal pad 30 by an operator, a possibility of unintended rotation of the pedal pad 30 can be lowered.

In the embodiment, when a stepping-on force is applied to the upper surface of the pedal pad 30 and the pedal pad 30 is displaced downward, the second link 62 rotates in the second rotation direction (counter-clockwise direction in FIG. 4) against the urging force of the coil spring 68 that is applied to the second link 62, and thus an urging force applied to the lever 90 is increased. Therefore, a pressing force by which the lever 90 presses the slider 80 against the pressed portion 49 is increased and a frictional force between the slider 80 and the pressed portion 49 is also increased.

Therefore, when there is an increase or decrease in stepping-on force that is applied to the pedal pad 30 stopped in a state where a large stepping-on force is applied to the pedal pad 30, a larger static friction force is generated between the slider 80 and the pressed portion 49 at the initial stage of rotation of the pedal pad 30 in comparison with a case where there is an increase or decrease in stepping-on force that is applied to the pedal pad 30 stopped in a state where a relatively small stepping-on force is applied to the pedal pad 30. Therefore, it is possible to more easily perform a fine adjustment of the rotation amount of the pedal pad 30 in a case where there is an increase or decrease in stepping-on force that is applied to the pedal pad 30 stopped in a state where a large stepping-on force is applied to the pedal pad 30.

Even when there is a change in stepping-on force applied to the pedal pad 30 due to vibration of the vehicle in a case where the pedal pad 30 is stopped in a state where a large stepping-on force is applied to the pedal pad 30 by the operator, a possibility of unintended rotation of the pedal pad 30 can be lowered in comparison with a case where the pedal pad 30 is stopped in a state where a relatively small stepping-on force is applied to the pedal pad 30.

Here, in the embodiment, the coil spring 68 urges the second link 62 in the first rotation direction (clockwise direction in FIG. 4) via the slider 80 by urging the slider 80 in the first rotation direction (clockwise direction in FIG. 4). Therefore, for example, when a foreign substance enters an area between the slider 80 and the pressed portion 49 and a frictional force between the slider 80 and the pressed portion 49 becomes large, an urging force that is applied to the second link 62 by the coil spring 68 may be weakened.

However, in the embodiment, even when the urging force that is applied to the second link 62 by the coil spring 68 is weakened, the second link 62 can be rotated in the first rotation direction while being separated from the slider 80 due to an urging force of the coil spring 69 since the coil spring 69 urges the second link 62 in the first rotation direction not via the slider 80. Accordingly, the pedal pad 30 can be returned to an original position.

In the embodiment, the second link 62 is provided with the hole 48 between the tip end portion 47A of the extending portion 47 and the slider 80, the hole 48 penetrating the second link in a downward direction from the upper surface 41.

Here, in the case of a configuration (comparative example) in which the second link 62 is not provided with the hole 48 between the tip end portion 47A of the extending portion 47 and the slider 80, the following phenomenon may occur when a foreign substance enters the housing 20 through the through-hole 25 of the housing 20. That is, the foreign substance entering the housing 20 may roll on the upper surface 41 of the second link 62 and enter the area between the slider 80 and the pressed portion 49. When the foreign substance enters the area between the slider 80 and the pressed portion 49, there may be abnormal friction.

However, in the embodiment, even when the foreign substance entering the housing 20 rolls on the upper surface 41 in a direction from the tip end portion 47A of the extending portion 47 to the slider 80, the foreign substance falls into the hole 48, and thus the foreign substance is restrained from reaching the slider 80 since the second link 62 is provided with the hole 48 between the tip end portion 47A of the extending portion 47 and the slider 80, the hole 48 penetrating the second link in the downward direction from the upper surface 41. Therefore, it is possible to restrain the foreign substance from entering the area between the slider 80 and the pressed portion 49.

Modification Example of Second Link 62

Figure 9:
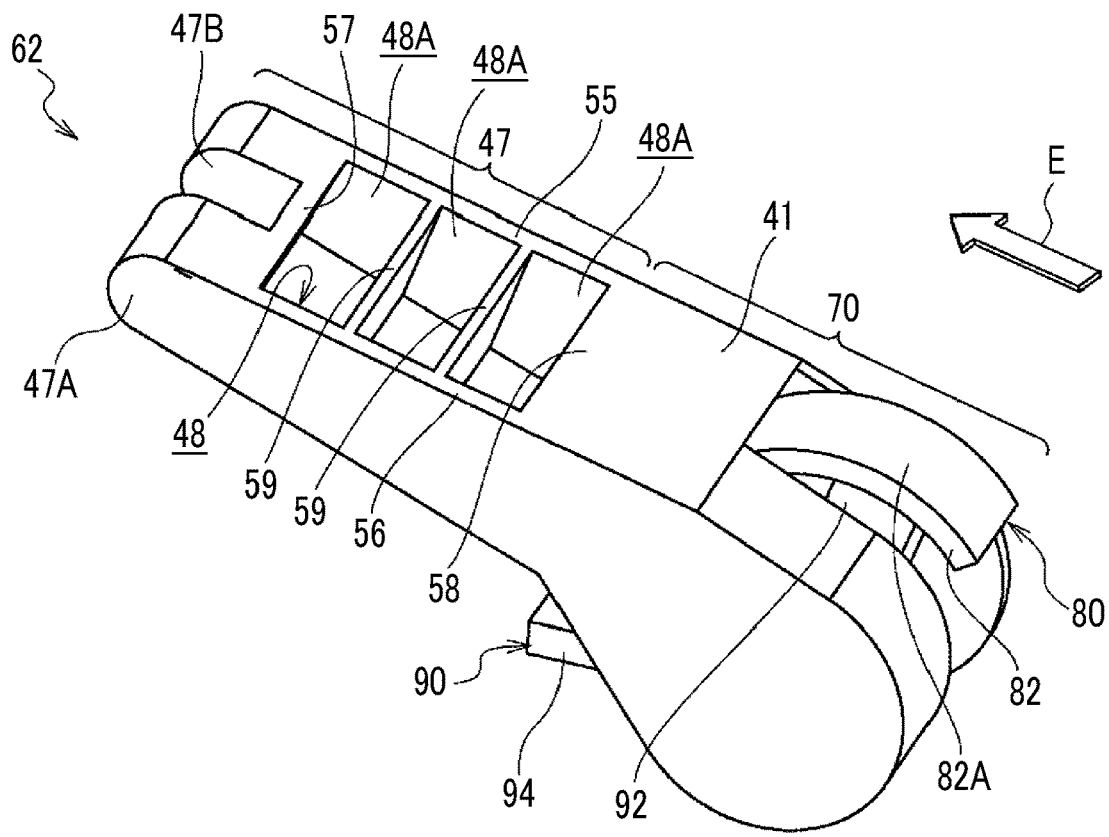
FIG. 9 is a perspective view illustrating a modification example of the second link.

In the embodiment, the single rectangular hole 48 is formed in the extending portion 47 of the second link 62. However, the configuration is not limited to this. For example, as illustrated in FIG. 9, a configuration in which connection portions 59 that connect the right side portion 55 and the left side portion 56 of the extending portion 47 are provided in the hole 48 may also be adopted. In the configuration illustrated in FIG. 9, a plurality of (for example, two) connection portions 59 is disposed to extend in a direction in which the extending portion 47 extends (oblique forward and upward direction (direction along arrow E)). Accordingly, the hole 48 is configured with a plurality of (for example, three) small holes 48A disposed to extend in the direction in which the extending portion 47 extends (oblique forward and upward direction).

In the case of the configuration illustrated in FIG. 9, the connection portions 59 support the right side portion 55 and the left side portion 56, and thus deformation of the extending portion 47 can he suppressed.

Figure 10:
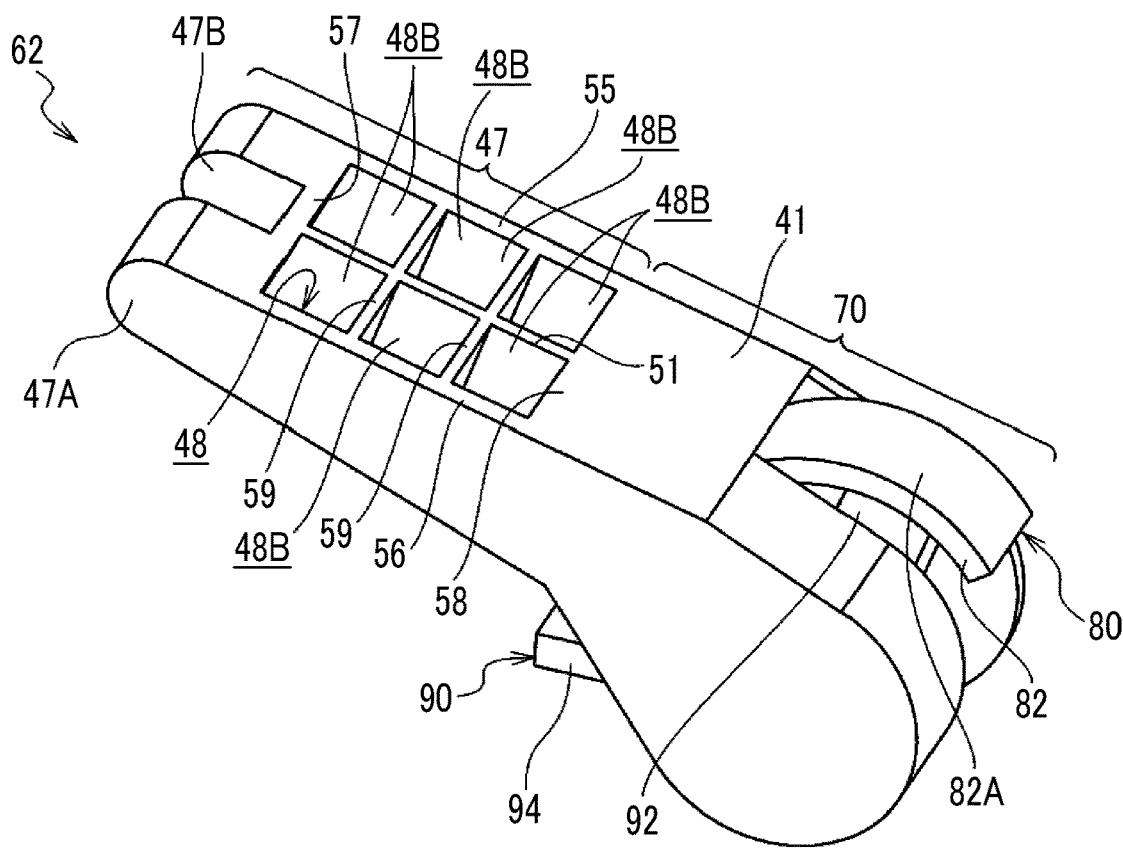
FIG. 10 is a perspective view illustrating a modification example of the second link.

As illustrated in FIG. 10, a configuration in which a connection portion 51 that connects the front side portion 57, the two connection portions 59, and the rear side portion 58 to each other is provided may also be adopted. The connection portion 51 extends from a central portion of the front side portion 57 in a width direction to a central portion of the rear side portion 58 in the width direction. Therefore, the connection portion 51 connects the central portion of the front side portion 57 in the width direction, the central portions rifle two connection portions 59 in the width direction, and the central portion of the rear side portion 58 in the width direction to each other in this order. Therefore, the hole 48 is configured with a plurality of (for example, two) rows of small holes 48B arranged in the vehicle width direction, each of the rows include a plurality of (for example, three) small holes 48B arranged in the direction in which the extending portion 47 extends (oblique forward and upward direction).

In the case of the configuration illustrated in FIG. 10, the connection portion 51 supports the front side portion 57 and the rear side portion 58, and thus deformation of the extending portion 47 can be further suppressed. The extending portion 47 may be configured to have the connection portion 51 extending from the central portion of the front side portion 57 in the width direction to the central portion of the rear side portion 58 in the width direction without having the connection portions 59.

Figure 11:
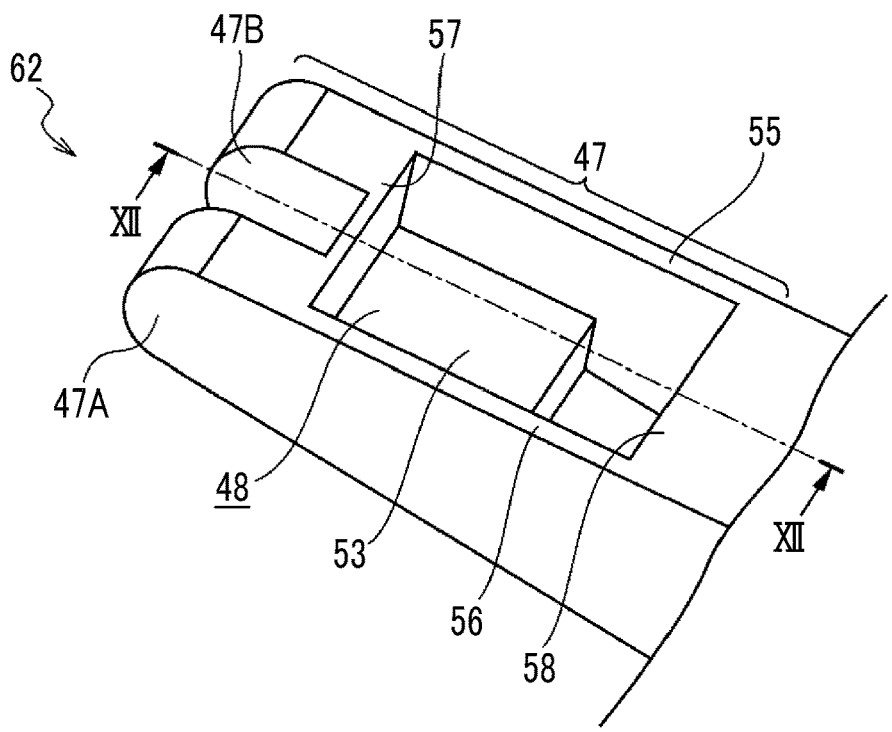
FIG. 11 is a perspective view illustrating a modification example of the second link.

As illustrated in FIG. 11, a configuration in which a supporting plate 53 connected to the right side portion 55, the left side portion 56, and the front side portion 57 is provided in a lower portion of the hole 48 may also be adopted. In this configuration, the hole 48 is open downward between the supporting plate 53 and the rear side portion 58 as illustrated in FIG. 12.

Figure 12:
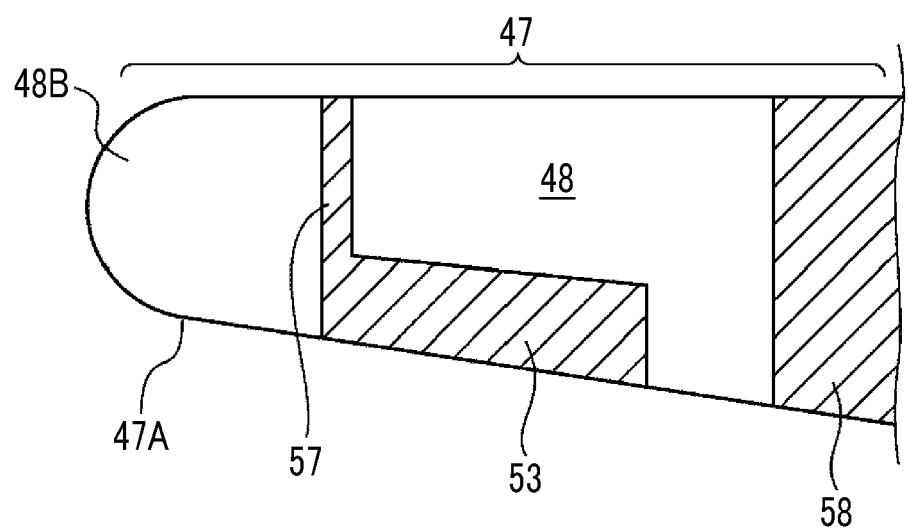
FIG. 12 is a sectional view (sectional view taken along line XII-XII) of the second link according to the modification example illustrated in FIG. 11.

In the case of the configuration illustrated in FIGS. 11 and 12, the supporting plate 53 supports the right side portion 55, the left side portion 56, and the front side portion 57, and thus deformation of the extending portion 47 can be suppressed.

Other Modification Examples

In the embodiment, the pressed portion 49 is provided on the inner wall of the upper wall 24 of the housing 20. However, the configuration is not limited to this. The pressed portion 49 may be the inner wall itself of the upper wall 24 of the housing 20. That is, the pressed portion may be a contact surface such as a wall surface or the like formed on a constituent portion of a wall portion or the like constituting a portion of the housing 20.

In the embodiment, the second link 62 is provided with the slider 80 that is rubbed with the pressed portion 49. However, the configuration is not limited to this. For example, the friction portion that is rubbed with the pressed portion 49 may be a friction surface formed on a constituent portion of the second link 62. The friction portion may be integrally provided with the second link 62.

In the embodiment, the coil spring 68 urges the second link 62 via the slider 80. However, the configuration is not limited to this. For example, in a case where the friction portion is a friction surface formed on a constituent portion of the second link 62 or the friction portion is integrally provided with the second link 62, the urging member may directly urge the second link 62 or the urging member may indirectly urge the second link 62 by urging the pedal pad 30 or the first link 61.

In the embodiment, the vehicle pedal device 10 is an organ type pedal device used as an accelerator pedal of an automobile. However, the vehicle pedal device 10 is not limited to the organ type pedal device as described above. For example, the vehicle pedal device may be an organ type pedal device used as a brake pedal of an automobile.

The aspect of the disclosure is not limited to the embodiment and various changes, modifications, and improvements can be made without departing from the scope of the disclosure.

What is claimed is:

1. A vehicle pedal device comprising:
   a pedal pad disposed to be inclined such that a height of the pedal pad becomes higher toward a front side, a lower end portion of the pedal pad being rotatably supported, an upper surface of the pedal pad being a surface to which a stepping-on force is applied;
   a housing provided below the pedal pad and provided with a through-hole on a facing wall facing a lower surface of the pedal pad;
   a first link passing through the through-hole, a first end portion of the first link being rotatably connected to the pedal pad, a second end portion of the first link being disposed in the housing;
   a second link, a first end portion of the second link being rotatably connected to the second end portion of the first link, a second end portion of the second link being supported in the housing such that the second end portion of the second link is rotatable in a first rotation direction in which the pedal pad is displaced upward and a second rotation direction in which the pedal pad is displaced downward;
   a first urging member configured to urge the second link in the first rotation direction; and
   a friction portion disposed on the second end portion of the second link, the friction portion being pressed against a pressed portion provided in the housing and configured to apply a rotation resistance to the second link by being rubbed with the pressed portion while rotating along with the second link, wherein:
   the second end portion of the second link is positioned between the lower end portion of the pedal pad and the through-hole on the facing wall of the housing;
   the second link is provided with an inclined surface inclined downward to extend in a direction from the first end portion of the second link to the friction portion; and
   the second link is provided with a hole between the first end portion of the second link and the friction portion, the hole penetrating the second link in a downward direction from the inclined surface.

2. The vehicle pedal device according to claim 1, wherein:
   the first urging member is configured to urge the second link in the first rotation direction via the friction portion by urging the friction portion in the first rotation direction;
   the second link is rotatable in the first rotation direction while being separated from the friction portion; and
   the vehicle pedal device includes a second urging member configured to urge the second link in the first rotation direction not via the friction portion.

3. The vehicle pedal device according to claim 2, further comprising
   a pressing member supported in the housing by a rotation shaft such that the pressing member is rotatable in a pressing direction in which the friction portion is pressed against the pressed portion, the rotation shaft of the pressing member being positioned at a different position from a rotation shaft of the second link, wherein
   the first urging member is configured such that:
   a first end portion of the first urging member is in contact with the friction portion and urges the second link in the first rotation direction via the friction portion by urging the friction portion in the first rotation direction;
   a second end portion of the first urging member is in contact with the pressing member and urges the pressing member in the pressing direction; and
   urging force applied to the pressing member is increased when the second link rotates in the second rotation direction against an urging force applied to the second link.

4. A vehicle pedal device comprising:
   a pedal pad disposed to be inclined such that a height of the pedal pad becomes higher toward a front side, a lower end portion of the pedal pad being rotatably supported, an upper surface of the pedal pad being a surface to which a stepping-on force is applied;
   a housing provided below the pedal pad and provided with a through-hole on a facing wall facing a lower surface of the pedal pad;
   a first link passing through the through-hole, a first end portion of the first link being rotatably connected to the pedal pad, a second end portion of the first link being disposed in the housing;
   a second link, a first end portion of the second link being rotatably connected to the second end portion of the first link, a second end portion of the second link being supported in the housing such that the second end portion of the second link is rotatable in a first rotation direction in which the pedal pad is displaced upward and a second rotation direction in which the pedal pad is displaced downward;
   a first urging member configured to urge the second link in the first rotation direction; and
   a friction portion pressed against a pressed portion provided in the housing and configured to apply a rotation resistance to the second link by being rubbed with the pressed portion while rotating along with the second link,
   wherein:
   the first urging member is configured to urge the second link in the first rotation direction via the friction portion by urging the friction portion in the first rotation direction;
   the second link is rotatable in the first rotation direction while being separated from the friction portion; and
   the vehicle pedal device includes a second urging member configured to urge the second link in the first rotation direction not via the friction portion.

5. The vehicle pedal device according to claim 4, wherein:
   the friction portion is disposed in the second end portion of the second link;
   the second link is provided with an inclined surface inclined downward to extend in a direction from the first end portion of the second link to the friction portion; and the second link is provided with a hole between the first end portion of the second link and the friction portion, the hole penetrating the second link in a downward direction from the inclined surface.

6. The vehicle pedal device according to claim 4, further comprising
a pressing member supported in the housing by a rotation shaft such that the pressing member is rotatable in a pressing direction in which the friction portion is pressed against the pressed portion, the rotation shaft of the pressing member being positioned at a different position from a rotation shaft of the second link, wherein
the first urging member is configured such that:
a first end portion of the first urging member is in contact with the friction portion and urges the second link in the first rotation direction via the friction portion by urging the friction portion in the first rotation direction;
a second end portion of the first urging member is in contact with the pressing member and urges the pressing member in the pressing direction; and
urging force applied to the pressing member is increased when the second link rotates in the second rotation direction against an urging force applied to the second link.

\* \* \* \* \*